United States Patent
Tabakovic

[11] Patent Number: 6,011,076
[45] Date of Patent: Jan. 4, 2000

[54] LATEX FOAM

[75] Inventor: Rifat Tabakovic, Joliet, Ill.

[73] Assignee: Flexible Products Company, Marietta, Ga.

[21] Appl. No.: 09/112,420

[22] Filed: Jul. 9, 1998

[51] Int. Cl.$^7$ ............................................. C08J 9/14
[52] U.S. Cl. ............................... 521/65; 521/72; 521/78; 521/84.1
[58] Field of Search ................. 521/65, 72, 78, 521/84.1

[56] References Cited

U.S. PATENT DOCUMENTS

| | | |
|---|---|---|
| Re. 23,697 | 8/1953 | Stauffer . |
| 2,158,033 | 5/1939 | McKinney . |
| 2,945,826 | 7/1960 | Everett . |
| 3,107,225 | 10/1963 | Rogers, Jr. . |
| 3,502,600 | 3/1970 | Kühlkamp et al. . |
| 3,538,025 | 11/1970 | Robert et al. . |
| 3,551,361 | 12/1970 | Needham . |
| 3,673,125 | 6/1972 | Takahashi et al. . |
| 4,288,559 | 9/1981 | Illger et al. . |
| 4,425,440 | 1/1984 | Bloembergen et al. . |
| 4,460,711 | 7/1984 | Jacobson . |
| 4,480,053 | 10/1984 | Sherno . |
| 4,501,825 | 2/1985 | Magyar et al. . |
| 4,590,220 | 5/1986 | Bauman et al. . |
| 4,634,733 | 1/1987 | Bauman et al. . |
| 4,647,618 | 3/1987 | Bauman et al. . |
| 4,863,655 | 9/1989 | Lacourse et al. . |
| 4,990,373 | 2/1991 | Kittle . |
| 5,026,735 | 6/1991 | Stern . |
| 5,035,930 | 7/1991 | Lacourse et al. . |
| 5,043,196 | 8/1991 | Lacourse et al. . |
| 5,124,363 | 6/1992 | Stern . |
| 5,153,037 | 10/1992 | Alteri . |
| 5,156,765 | 10/1992 | Smrt et al. . |
| 5,185,382 | 2/1993 | Neumann et al. . |
| 5,208,267 | 5/1993 | Neumann et al. . |
| 5,248,702 | 9/1993 | Neumann et al. . |
| 5,266,368 | 11/1993 | Miller . |
| 5,272,181 | 12/1993 | Boehmer et al. . |
| 5,288,765 | 2/1994 | Bastioli et al. . |
| 5,308,879 | 5/1994 | Akamatu et al. . |
| 5,360,830 | 11/1994 | Bastioli et al. . |
| 5,612,385 | 3/1997 | Ceaser et al. . |
| 5,756,556 | 5/1998 | Tsai et al. . |

*Primary Examiner*—Morton Foelak
*Attorney, Agent, or Firm*—Vedder, Price, Kaufman & Kammholz; James T. FitzGibbon

[57] ABSTRACT

A composition of a vinyl acetate acrylic copolymer or a carboxylated acrylic copolymer with or without additional latices, about 1 to 6 parts of a non-ionic surfactant, from 0 to 4 parts of a coalescing agent and from 0 to 5 parts of a co-surfactant, with about 15 to 100 parts of starch. A propellant is from about 2% to 10% by weight of the entire composition, and the composition is contained in an aerosol can. A method is also described.

5 Claims, No Drawings

LATEX FOAM

BACKGROUND OF THE INVENTION

The present invention relates generally to foam products, and more particularly, to aqueous foamed products of improved workability, reduced sag, and those which will operate under an expanded range of temperatures.

Foam sealants of various kinds have been used in the construction industry, and particularly in the do-it-yourself market, for many years. Such foams have traditionally been of the urethane type, although certain modified acrylic foams and the like have been known for these and other uses.

Among the applications for such foams are filling of cracks, holes around pipes, and in other applications where it is desired to seal the hole or crack against outside weather. In addition, it is often desired to use such foams or the like as patches, over which paint or other decoration is possible. However, foam sealants use for these and like purposes have had a number of drawbacks, particularly in view of the nature of urethane or like products.

Most if not all of these sealants are of the type which adhere strongly to the substrate, be it wood, plaster, vinyl window jams or the like. However, as is the case with urethane foams and other like products, the foams have an extremely sticky nature. Inasmuch as they adhere strongly to the substrate to which they are intended to be applied, they also adhere strongly to the fingers of the person applying them, to paddles or trowels used to apply them or attempting to smooth then out, as well as to the dispensing nozzles or the like from which they are dispensed. Such foams are often capable of only one use, or one use within a short interval, say 5 minutes.

Consequently, there has been a need for a foam which would possess some or all of the qualities of a strongly adherent foam for sealing purposes, but one which could be "cleaned up" with water. Such a foam product would be capable of easy application, following which one could clean the instruments used to apply it, such as a trowel or other similar tool. However, attempts to make a foam that would be useful for filling cracks, openings around pipes, gaps in new or remodeled construction and the like have suffered from considerable drawbacks.

Specifically, although these foams are satisfactory to a certain extent, they are generally very soft and lacking considerably in mechanical strength. In many cases, the foam "skin" is not smooth. The skin possesses many so-called "dragons" formed by leaking and expanding of uncured product through cracks in the skin which are created during foam curing. In other words, the foam first forms a skin, but thereafter, it continues to foam on the inside. When this occurs, the internal expansion causes uncured foam to pass through the cracks in the skin. This creates an undesirable effect, as well as one which requires trimming by the operator. The time for such phenomenon to occur can be considerable, also.

With known foams of the water-based or water-dilutable type, the time for internal curing is exceptionally long. This is particularly amazing when the foam is used for filling larger voids. If the foam is cured under adverse conditions, such as under high humidity, low temperature, or both, curing can be delayed or, in the worst case, not occur at all.

Concerning the application of such foams, both comparatively high and comparatively low temperatures cause a typical to sag significantly from its as-applied condition. By way of illustration, temperatures below 40° and above 85° are not ideal, and in fact, may be unsatisfactory. Such a rather narrow temperature range, is also disadvantageous for use of the product.

In other words, if the foam sought to be cured at either too high or too low a temperature, it may sag significantly. Cured foams of the prior art are not dimensionally stable, particularly when exposed to water over a short period of time. After the foam redries upon being wet, it shrinks to a great extent and this is considered very undesirable.

Where open-backed gaps are large, say three-quarters of an inch or more, it is not possible to fill them successfully with known foams which can be cleaned up with water.

Once the prior art foams are installed, if they are exposed to heat at about 120° F. or higher, the properties of the cured foam gradually begin to deteriorate, and after approximately one week at such temperatures, the foam cores yellow and become porous, losing their texture to a greater or less extent.

Accordingly, it is an object of the present invention to provide an improved, latex-based aerosol foam sealant that is able to be cleaned up with water following use.

Another object of the present invention is to provide a foam which is white in color.

Yet another object of the invention is to provide an improved foam for which the dispensing may be started and then stopped again, even after a fairly long interval, without significantly adversely affecting its properties.

Still another object of the invention is to provide a foam of improved mechanical strength, particularly compression resistance (stiffness) and which is free from friability. In other words, such a foam is not only stronger, but tough and resilient in relation to existing foam products that will clean up readily with water.

A further object of the invention is to provide a foam that is capable of water clean-up, and which, when applied, will have a smooth, thick, consistent skin, free from cracks or the like in its surface.

A still further object of the invention is to provide a foam which will cure not only on the surface, but within the interior of a large volume, or in a mass having a small surface-to-volume ratio.

An additional object of the invention is to provide a foam with water clean-up that is able to fill comparatively large voids or gaps, and which will cure internally when used in these applications.

Another object of the invention is to provide a foam that will cure under conditions of higher humidity and at lower temperatures than its existing counterparts in the prior art.

Yet another object of the invention is to provide a foam which has a high temperature range, up to 120° F. or more, during which the product may be applied and under which it may be cured without sagging or undergoing other adverse effects.

Still another object of the invention is to provide a foam sealant, when cured, is dimensionally stable when exposed to water.

A further object of the invention is to provide a foam which will act as a sealant and which may be exposed in the can to temperatures of up to 120° F. for over one month, or perhaps considerably longer, such as one year, without affecting the characteristics of the foam when it is dispensed from an aerosol container.

A still further object of the invention is to provide a foam which is dispensable in a smooth, controllable, and even in a restartable manner.

An additional object of the invention is to provide a toolable foam, that is, one which may be applied with a trowel or putty knife and one which, when installed, may be painted or decorated without undue trouble.

Another object of the invention, in some cases, is to provide a foam which can be dispensed from an aerosol container without using fluorocarbons or other environmentally undesirable propellants.

In accordance with the foregoing objectives, the present invention achieves these objects and advantages and others which are inherent therein by providing latex-based foam, preferably of an acrylic/vinyl acetate, styrene/carboxylated acrylic copolymer, preferably in an amount of from 60 to 140 parts acrylic latex, from about 0 to 150 parts of a modified latex, from about 25 to 150 parts of corn, potato or other starch, and suitable co-surfactants and/or thickener, coalescing agents, tertiary amines, and blowing agents, the latter preferably comprising from about 0% to 50% dialkyl ether and the balance low molecular weight hydrocarbons such as propane and butane/isobutane.

While the invention will be described in connection with certain preferred embodiments, the invention is not intended to be limited to a listing of such ingredients. On the contrary, the invention is intended cover all alternatives, modifications, and equivalent compositions as may be included within the spirit and scope of the invention as defined by the appended claims.

The present invention contemplates a composition intended to be used with an aerosol container, which upon discharge, creates a foam. Such a foam is comparatively very stable. It is capable of curing throughout into a solid mass of very low density, and generally comprises a foam-forming polymer or polymers in latex form, a starch ingredient such as corn starch or potato starch, a surfactant, and optimally a co-surfactant, foam stabilizer and/or thickener, a pH adjusting agent, and a propellant, preferably in the range of 4% to 6% of the total formulation and comprising, for example, dimethyl ether, propane and isobutane.

All parts include water or other diluent and are by weight in grams as the product is furnished. Thus, for example, 60 grams of Rovace 86 would be about 32 grams of solids.

EXAMPLE 1

A representative example of a stable foam was made as follows:

| Ingredient | Grams |
| --- | --- |
| Vinyl acetate/acrylic copolymer (30%/70%) (Rovace 86) | 60 |
| Carboxylated styrene acrylic polymer (Synthemul 40422) | 40 |
| N,N-Dimethyl-1-octadecamine (Armeen DM18D) | 1.6 |
| Polyoxyethylene (23) lauryl ether (BRIJ 35 Liquid/Gel) | 2.0 |
| Dipropylene glycol monomethyl ether (Dowanol DPM) | 1.1 |
| Ethylene glycol (Ethylene glycol) | 1.0 |
| Polyoxyethyleneoxide (Polyox WSR,N-3000) | 0.2 |
| Corn or potato unmodified starch (Starch) | 40 |
| Propane/isobutane/dimethyl ether (11.2/68.3/20 Wt. %) (A-45/DME Propellant) | 6 |

The vinyl acetate/acrylic copolymer was obtained from Rohm and Haas under the trademark "ROVACE 86." The polymers were emulsified in a latex containing about 54% to 56% solids and the remainder, except for emulsifiers, etc. was water. The Synthemul 40422 was a carboxylated styrene/acrylic copolymer obtained from Reichhold Chemical, Inc. It is modified by the addition of a carboxylated styrene. It is furnished in approximately a 50% solids emulsion, with the balance being essentially water.

The Armeen DM18D is a tertiary amine used to adjust the pH of the overall composition. It comprised a dimethyl stearyl-amine $C_{18}H_{37}N(CH_3)_2$. The major emulsifying agent, polyoxyethylene (23) lauryl ether (23 being the approximate average number of ethylene oxide units per mol) was present in the amount of 2 grams. This composition typically had an acid value of 0.3, a water content of 27% to 31% and a hydroxyl value of 49. The acid value could range as high as about 5, and the hydroxyl value could range from 40 to 60 lb. It had an HLB of about 16.7 and was water soluble.

The dipropylene glycol monomethyl ether, is made by Dow Chemical Company. It is infinitely soluble in water, and served as a coalescing agent.

The ethylene glycol serves as an anti-freeze for the solution. The polyoxyethylene oxide is a water soluble resin, namely, a polyether having a molecular weight of 100,000 to 8,000,000. In a typical material, it has a melting point of 62° to 67° C. and a bulk density of 31 lbs. per cubic foot. Up to three parts per hundred of fumed silica may be present in the polyether composition, and other components and impurities may be present in amounts of less than that. The polyether is an infinitely water soluble resin, and in the present application, serves to stabilize the foam, and apparently further act to emulsify the foam components and increase the viscosity of the overall mixture.

The corn starch (or potato starch) is preferably a bleached, food-grade starch and present in an amount of about 40 grams. This component is thought to be essential to the improvements in a foam that is capable of water cleanup. It greatly adds to the stability of the foam and aids curing throughout large masses or thick cross-sections. It dramatically improves cell size, regularity of cell size and creates a smooth skin. An industrial grade starch also proved satisfactory.

The last ingredient is the propellant, which comprises about from 4 to 6 Wt. % of the composition as a whole. In this example, approximately 4% by weight is present. The propellant is a mix with the approximate percentages of ingredients indicated being present. In addition to the specifically named ingredients, such propellant typically has less than 0.5% of ethane, up to 2.5% normal butane, 0.1% pentanes and a maximum of 200 ppm (parts per million) of unsaturated hydrocarbons. DME 45 is obtained from Technical Propellants, Inc. of Morris, Ill.

The compounds are mixed and placed in an aerosol can in a known manner. When discharged as a foam, the composition was used to fill cracks up to and larger than ¾ of an inch and to fill the spaces where pipes emerge from or enter a wall. In addition, large vertical or horizontal cracks up to and beyond ¾" were filled. The foam was smooth, thick and consistent, displaying no cracks in its surface. It was exceptionally free from sagging, even under a wide range of temperatures. The foam was flexible enough not to be friable and had much greater compression resistance than a counterpart foam without starch.

Thus, the starch seemed to add favorable properties to the uncured foam—freedom from sagging, etc. and to the cured foam as well—mechanical strength, flexibility and resilience. It was dispensed at 70° F., but is stable from approximately 40° F. to 120° F. As long as the temperature of the product in the can is also maintained within these limits, the foam produced is acceptable. After troweling, applying with a putty knife, or merely foaming directly from the can and curing, the improved foam, acting as a sealant, is dimensionally stable. After curing for a day or so, it could be immersed in water for three weeks without shrinking.

The described foam was placed in the above described applications and smoothed in place with a putty knife or trowel. The foam was able to be painted after the elapse of a reasonable time. It contained no fluorocarbons or other ingredients adverse to the environment. After applying the latex foam, the tools were able to be cleaned with soap and water, for any number of repeated uses. The foam that was discharged from the can could be started again, and thus, a partially used can need not be either used or discarded, but may be used in another application.

EXAMPLE 2

Various experiments were conducted to determine the approximate ranges throughout which a stable and otherwise valuable foam could be made using the ingredients set forth in Example 1. A very effective foam was able to be made anywhere within the following ranges of ingredients.

| Ingredient | Range (Grams) |
| --- | --- |
| Vinyl acetate/acrylic copolymer (30%/70%) (Rovace 86) | 50–70 |
| Carboxylated styrene acrylic polymer (Synthemul 40422) | 30–50 |
| N,N-Dimethyl-1-octadecamine (Armeen DM18D) | 1–2.5 |
| Polyoxyethylene (23) lauryl ether (BRIJ 35 Liquid/Gel) | 1.8–5 |
| Dipropylene glycol monomethyl ether (Dowanol DPM) | 1–2.5 |
| Ethylene glycol (Ethylene glycol) | 1–2 |
| Polyoxyethyleneoxide (Polyox WSR,N-3000) | 0.1–0.4 |
| Corn or potato unmodified starch (Starch) | 30–55 |
| Propane/isobutane/dimethyl ether (11.2/68.3/20 Wt. %) (A-45/DME Propellant) | 3–8% of the total Wt. |

EXAMPLE 3

A stable foam was prepared as follows. This foam was well suited for water cleanup.

| Ingredient | Grams |
| --- | --- |
| Vinyl acetate/acrylic copolymer (30%/70%) (Rovace 86) | 100 |
| N,N-Dimethyl-1-octadecamine (Armeen DM18D) | 1.6 |
| Polyoxyethylene (23) lauryl ether (BRIJ 35 Liquid/Gel) | 3.0 |
| Dipropylene glycol monomethyl ether (Dowanol DPM) | 1.1 |
| Ethylene glycol (Ethylene glycol) | 1.0 |
| Polyoxyethyleneoxide (Polyox WSR,N-3000) | 0.2 |
| Corn or potato unmodified starch (Starch) | 29 |
| Propane/isobutane/dimethyl ether (11.2/68.3/20 Wt. %) (A-45/DME Propellant) | 5% of the total Wt. |

In the above example, the ingredients were very similar to Example 1, except that the copolymer was strictly a vinyl acetate/acrylic copolymer. No carboxylated styrene acrylic polymer was used. The starch was diminished to about 29 grams. The resulting product displayed generally excellent properties, particularly in resilience and flexibility under repeated deformation.

EXAMPLE 4

Various experiments were conducted to determine the approximate ranges throughout which a stable and otherwise valuable foam could be made using the ingredients set forth in Example 3. An effective foam was able to be made generally within the following ranges of ingredients.

| Ingredient | Range (Grams) |
| --- | --- |
| Vinyl acetate/acrylic copolymer (30%/70%) (Rovace 86) | 100 |
| N,N-Dimethyl-1-octadecamine (Armeen DM18D) | 1.3–2.6 |
| Polyoxyethylene (23) lauryl ether (BRIJ 35 Liquid/Gel) | 2.5–7.0 |
| Dipropylene glycol monomethyl ether (Dowanol DPM) | 1.0–2.5 |
| Ethylene glycol (Anti-freeze) (Ethylene glycol) | 1.0–2.5 |
| Polyoxyethyleneoxide (Polyox WSR,N-3000) | 0.1–0.5 |
| Corn or potato unmodified starch (Starch) | 15–30 |
| Propane/isobutane/dimethyl ether (11.2/68.3/20 Wt. %) (A-45/DME Propellant) | 3%–6% of the total Wt. |

With the smaller amounts, for example, 15 grams of starch and 0.1 grams of the polyox material, the material displayed some sag and it was generally considered a borderline success. Such formulations having the extreme values listed would not be considered particularly successful (although operable), but those within or near the center of the ranges were considered very satisfactory to excellent.

EXAMPLE 5

A foam was made that proved satisfactory and was able to be cleaned up with water, as follows:

| Ingredient | Grams |
| --- | --- |
| Styrene/acrylic polymer (Rhoplex 928) | 60 |
| Carboxylated styrene acrylic polymer (Synthemul 40422) | 40 |
| N,N-Dimethyl-1-octadecamine (Armeen DM18D) | 1.6 |

-continued

| Ingredient | Grams |
| --- | --- |
| Polyoxyethylene (23) lauryl ether (BRIJ 35 Liquid/Gel) | 2.5 |
| Sodium lauryl sulfate (Calfoam SLS-30) | 2.0 |
| Dipropylene glycol monomethyl ether (Dowanol DPM) | 1.1 |
| Ethylene glycol (Ethylene glycol) | 1.1 |
| Polyoxyethyleneoxide (Polyox WSR,N-3000) | 0.2 |
| Corn or potato unmodified starch (Starch) | 19 |
| Propane/isobutane/dimethyl ether (11.2/68.3/20 Wt. %) (A-45/DME Propellant) | 3.9% of the total Wt. |

In this formulation, a styrene/acrylic polymer that was different from the earlier examples was used; and an additional amount of a second surfactant (Calfoam) was used. In this formulation, as long as the Polyox was present in an amount of about 0.2 grams or more, it was found that the starch could be diminished to about 19 grams. This foam proved satisfactory; it was more resilient than the foam of Example 1, and had less compression resistance. The cell structure was generally finer.

EXAMPLE 6

A foam that was able to be cleaned up with water was prepared as follows:

| Ingredient | Grams |
| --- | --- |
| Vinyl acetate/acrylic copolymer (Gelva TS-100) | 61 |
| Carboxylated styrene acrylic polymer (Synthemul 40422) | 42 |
| N,N-Dimethyl-1-octadecamine (Armeen DM18D) | 1.0 |
| Polyoxyethylene (23) lauryl ether (BRIJ 35 Liquid/Gel) | 2.2 |
| Dipropylene glycol monomethyl ether (Dowanol DPM) | 1.0 |
| Ethylene glycol (Ethylene glycol) | 1.0 |
| Polyoxyethyleneoxide (Polyox WSR,N-3000) | 0.2 |
| Corn or potato unmodified starch (Starch) | 23 |
| Propane/isobutane/dimethyl ether (11.2/68.3/20 Wt. %) (A-45/DME Propellant) | 4.3% of the total Wt. |

A different supplier was used for the vinyl acetate/acrylic copolymer, and slightly different proportions than in the above Example 5 were used. This foam was very satisfactory. Because the latex polymer was somewhat stiffer, less starch was used.

EXAMPLE 7

A latex foam that could be cleaned up with water was prepared as follows:

| Ingredient | Grams |
| --- | --- |
| Vinyl acetate/acrylic copolymer (30%/70%) (Rovace 86) | 60 |
| Carboxylated styrene acrylic polymer (Synthemul 40422) | 42 |
| N,N-Dimethyl-1-octadecamine (Armeen DM18D) | 1.6 |
| Polyoxyethylene (23) lauryl ether (BRIJ 35 Liquid/Gel) | 2.0 |
| Sodium lauryl sulfate (Calfoam SLS-30) | 2.0 |
| Dipropylene glycol monomethyl ether (Dowanol DPM) | 1.1 |
| Ethylene glycol (Ethylene glycol) | 1.0 |
| Polyoxyethyleneoxide (Polyox WSR,N-3000) | 0.2 |
| Corn or potato unmodified starch (Starch) | 40 |
| Propane/isobutane/dimethyl ether (11.2/68.3/20 Wt. %) (A-45/DME Propellant) | 5.4% of the total Wt. |

Both Calfoam and BRIJ 35 emulsifiers were used. Good emulsification properties were evident, including small, uniform cell size. The composition cured throughout. This foam had a slightly better cell structure, but was somewhat softer than the foam of Example 1.

EXAMPLE 8

A latex foam with anti-corrosion properties were prepared using the following ingredients:

| Ingredient | Grams |
| --- | --- |
| Vinyl acetate/acrylic copolymer (30%/70%) (Rovace 86) | 60 |
| Carboxylated styrene acrylic polymer (Synthemul 40422) | 44 |
| N,N-Dimethyl-1-octadecamine (Armeen DM18D) | 1.3 |
| Polyoxyethylene (23) lauryl ether (BRIJ 35 Liquid/Gel) | 4.8 |
| Anti-corrosion agent (mixture of amines) (Raybo 60) | 0.7 |
| Dipropylene glycol monomethyl ether (Dowanol DPM) | 1.1 |
| Ethylene glycol (Ethylene glycol) | 1.1 |
| Polyoxyethyleneoxide (Polyox WSR,N-3000) | 0.2 |
| Corn or potato unmodified starch (Starch) | 40 |
| Propane/isobutane/dimethyl ether (11.2/68.3/20 Wt. %) (A-45/DME Propellant) | 4.5% of the total Wt. |

This example featured almost 5 parts of BRIJ emulsifier and 0.7 parts of Raybo 60 as an anti-corrosion agent. This was a mixture of amines and tended to increase that pH. The extra primary emulsifier (4.8 parts of BRIJ 35) was necessary to insure sag-free foam curing. This foam was more rigid and had a coarser cell structure than the foam of Example 1. The foam was satisfactory.

EXAMPLE 9

A foam that could be cleaned up with water was prepared as follows:

| Ingredient | Grams |
| --- | --- |
| Vinyl acetate/acrylic copolymer (30%/70%) (Rovace 86) | 60 |
| Carboxylated styrene acrylic polymer (Synthemul 40422) | 40 |
| N,N-Dimethyl-1-octadecamine (Armeen DM18D) | 0.8 |
| Polyoxyethylene (23) lauryl ether (BRIJ 35 Liquid/Gel) | 4.0 |
| Anti-corrosion agent (Raybo 60) | 0.8 |
| Dipropylene glycol monomethyl ether (Dowanol DPM) | 1.1 |
| Ethylene glycol (Ethylene glycol) | 1.1 |
| Polyoxyethyleneoxide (Polyox WSR,N-3000) | 0.2 |
| Corn or potato unmodified starch (Starch) | 40 |
| Propane/isobutane/dimethyl ether (11.2/68.3/20 Wt. %) (A-45/DME Propellant) | 4.3% of the total Wt. |

This foam proved generally satisfactory, and was quite similar to the foam of Example 8.

EXAMPLE 10

A foam that could be cleaned up with water was prepared as follows:

| Ingredient | Grams |
| --- | --- |
| Vinyl acetate/acrylic copolymer (30%/70%) (Rovace 86) | 70 |
| Carboxylated styrene acrylic polymer (Synthemul 40422) | 30 |
| Triethanolamine (TEA) | 0.7 |
| Polyoxyethylene (23) lauryl ether (BRIJ 35 Liquid/Gel) | 2.3 |
| Sodium myristoylsarcosinate (Hamposyl M-30) | 2.2 |
| 2,2,4-trimethyl-1,3-pentanediol monoisobutyrate (Texanol) | 2.3 |
| Ethylene glycol (Ethylene glycol) | 2.0 |
| Corn or potato unmodified starch (Starch) | 70 |
| Propane/isobutane/dimethyl ether (11.2/68.3/20 Wt. %) (A-45/DME Propellant) | 4.6% of the total Wt. |

In this example, a different amine was used, namely, triethanolamine, and a 29%–31% solution of surface active agent, Hamposyl M-30, was used. The Texanol was furnished by Eastman Chemical Company of Kingsport, Tenn. This was an ester alcohol that served as a coalescing agent. This foam proved generally satisfactory. This demonstrated the use of 70 parts starch. The foam was comparatively rigid and the cell structure was slightly coarser than the foam of Example 1.

EXAMPLE 11

A foam that could be cleaned up with water was prepared as follows:

| Ingredient | Grams |
| --- | --- |
| Vinyl acetate/acrylic copolymer (30%/70%) (Rovace 86) | 40 |
| Carboxylated styrene acrylic polymer (Synthemul 40422) | 30 |
| Vinyl acetate/acrylic copolymer (more vinyl acetate) (Rovace 661) | 30 |
| N,N-Dimethyl-1-octadecamine (Armeen DM18D) | 1.0 |
| Polyoxyethylene (23) lauryl ether (BRIJ 35 Liquid/Gel) | 2.3 |
| Sodium lauryl sulfate (Calfoam SLS-30) | 1.2 |
| Dipropylene glycol monomethyl ether (Dowanol DPM) | 1.2 |
| Ethylene glycol (Ethylene glycol) | 1.2 |
| Polyoxyethyleneoxide (Polyox WSR,N-3000) | 0.2 |
| Corn or potato unmodified starch (Starch) | 33 |
| Propane/isobutane/dimethyl ether (11.2/68.3/20 Wt. %) (A-45/DME Propellant) | 4.4% of the total Wt. |

This composition contained three lattices in addition to the starch. A coalescing agent in the form of Dowanol DPM was present also. This foam proved generally satisfactory. It was finer in cell structure, but the foam was less rigid than in Example 1.

EXAMPLE 12

A foam that could be cleaned up with water was prepared as follows:

| Ingredient | Grams |
| --- | --- |
| Vinyl acetate/acrylic copolymer (30%/70%) (Rovace 86) | 100 |
| (N.N-dimethyldodecylamine) | 1.0 |
| Octylphenoxypolyethoxyethanol (Triton X-405) | 2.0 |
| N-lauroyl sarcosine triethanolamine (Hamposyl TL-40) | 1.0 |
| Myristyl alcohol (Myristyl alcohol) | 0.2 |
| Dipropylene glycol dimethyl ether (Proglyde DMM) | 1.0 |
| Ethylene glycol (Ethylene glycol) | 1.4 |
| Corn or potato unmodified starch (Starch) | 41 |
| Propane/isobutane (20–24/76–80 Wt. %) (A-50 Propellant) | 4.4% of the total Wt. |

This composition also used a slightly different amine, N.N-dimethyldodecylamine, and a different surface active agent, Triton X-405. Another surfactant salt, namely N-lauroyl sarcosine triethanolamine was used. This came in a water solution containing 40%–42% active ingredient and about 2% lauric acid triethanolamine. In addition, this composition included small amounts of myristyl alcohol (a co-surfactant) and Proglyde DMM (a coalescing agent). This foam proved generally satisfactory.

EXAMPLE 13

A foam that could be cleaned up with water was prepared as follows:

| Ingredient | Grams |
| --- | --- |
| Vinyl acetate/acrylic copolymer (30%/70%) (Rovace 86) | 100 |
| — — — (N,N-dimethyldodecylamine) | 1.0 |
| Octylphenoxypolyethoxyethanol (Triton X-405) | 2.0 |
| N-lauroyl sarcosine triethanolamine (Hamposyl TL-40) | 2.3 |
| Myristyl alcohol (Myristyl alcohol) | 0.2 |
| Dipropylene glycol dimethyl ether (Proglyde DMM) | 1.0 |
| Ethylene glycol (Ethylene glycol) | 1.4 |
| Corn or potato unmodified starch (Starch) | 42 |
| Propane/isobutane (20–24/76–80 Wt. %) (A-50 Propellant) | 3.8% of the total Wt. |

This foam proved generally satisfactory. A different propellant, free from alkyl ether, was used. This example used 42 parts starch and 100 grams of latex. This foam was rigid and had a slightly coarser cell structure than the foam of Example 1.

EXAMPLE 14

A foam that could be cleaned up with water was prepared as follows:

| Ingredient | Grams |
| --- | --- |
| Vinyl acetate/acrylic copolymer (30%/70%) (Rovace 86) | 70 |
| Carboxylated styrene acrylic polymer (Synthemul 40422) | 35 |
| Triethanolamine (TEA) | 0.7 |
| Octylphenoxypolyethoxyethanol (Triton X-405) | 2.3 |
| Myristyltrimethylammonium bromide (Cetyl bromide) | 1.3 |
| Dipropylene glycol dimethyl ether (Proglyde DMM) | 2.0 |
| Ethylene glycol (Ethylene glycol) | 2.0 |
| Corn or potato unmodified starch (Starch) | 70 |
| Propane/isobutane (20–24/76–80 Wt. %) (A-50 Propellant) | 4.2% of the total Wt. |

This example used various ingredients from the other examples, with the addition of cetyl bromide, which was used as a co-surfactant. This foam proved generally satisfactory.

EXAMPLE 15

A foam that could be cleaned up with water was prepared as follows:

| Ingredient | Grams |
| --- | --- |
| Vinyl acetate/acrylic copolymer (30%/70%) (Rovace 86) | 70 |
| Carboxylated styrene acrylic polymer (Synthemul 40422) | 32 |
| Triethanolamine (TEA) | 0.7 |
| N-lauroyl sarcosine triethanolamine (Hamposyl TL-40) | 2.5 |
| Sodium myristoylsarcosinate (Hamposyl M-30) | 2.2 |
| 2,2,4-trimethyl-1,3-pentanediol monoisobutyrate (Texanol) | 2.3 |
| Ethylene glycol (Ethylene glycol) | 2.1 |
| Corn or potato unmodified starch (Starch) | 70 |
| Propane/isobutane (20–24/76–80 Wt. %) (A-50 Propellant) | 3.5% of the total Wt. |

This foam used 70 parts of starch and was fairly rigid compared to Example 1. It was generally satisfactory.

EXAMPLE 16

Several other foams were prepared as follows; all could be cleaned up after use with water.

| Ingredient | Grams |
| --- | --- |
| Acrylic polymer (Rhoplex 1950) | 60 |
| Carboxylated styrene acrylic polymer (Synthemul 40422) | 40 |
| N,N-Dimethyl-1-octadecamine (Armeen DM18D) | 1.6 |
| Polyoxyethylene (23) lauryl ether (BRIJ 35 Liquid/Gel) | 2.1 |
| Dipropylene glycol monomethyl ether (Dowanol DPM) | 1.1 |
| Ethylene glycol (Ethylene glycol) | 1.2 |
| Sodium lauryl sulfate (Calfoam SLS 30) | 1.5 |
| Polyoxyethyleneoxide (Polyox WSR,N-3000) | 0.2 |
| Corn or potato unmodified starch (Starch) | 34 |
| Propane/isobutane/dimethyl ether (11.2/68.3/20 Wt. %) (A-45/DME Propellant) | 5.2% of the total Wt. |

EXAMPLE 17

| Ingredient | Grams |
| --- | --- |
| Vinyl acetate/butyl acrylate copolymer (Ucar 162) | 60 |
| Carboxylated styrene acrylic polymer (Synthemul 40422) | 40 |
| N,N-Dimethyl-1-octadecamine (Armeen DM18D) | 1.6 |
| Polyoxyethylene (23) lauryl ether (BRIJ 35 Liquid/Gel) | 2.5 |
| Dipropylene glycol monomethyl ether (Dowanol DPM) | 1.1 |

-continued

| Ingredient | Grams |
| --- | --- |
| Ethylene glycol (Ethylene glycol) | 1.1 |
| Sodium lauryl sulfate (Calfoam SLS 30) | 2.0 |
| Polyoxyethyleneoxide (Polyox WSR,N-3000) | 0.2 |
| Corn or potato unmodified starch (Starch) | 22 |
| Propane/isobutane/dimethyl ether (11.2/68.3/20 Wt. %) (A-45/DME Propellant) | 4.0% of the total Wt. |

EXAMPLE 18

| Ingredient | Grams |
| --- | --- |
| Acrylic terpolymer (methacrylic acid, acrylonitrile, butyl acrylate) (Ucar 123) | 60 |
| Carboxylated styrene acrylic polymer (Synthemul 40422) | 40 |
| N,N-Dimethyl-1-octadecamine (Armeen DM18D) | 1.0 |
| Polyoxyethylene (23) lauryl ether (BRIJ 35 Liquid/Gel) | 2.5 |
| Dipropylene glycol monomethyl ether (Dowanol DPM) | 1.0 |
| Ethylene glycol (Ethylene glycol) | 1.0 |
| Sodium lauryl sulfate (Calfoam SLS 30) | 2.0 |
| Polyoxyethyleneoxide (Polyox WSR,N-3000) | 0.2 |
| Corn or potato unmodified starch (Starch) | 25 |
| Propane/isobutane/dimethyl ether (11.2/68.3/20 Wt. %) (A-45/DME Propellant) | 4.16% of the total Wt. |

EXAMPLE 19

| Ingredient | Grams |
| --- | --- |
| Vinyl acetate/acrylic copolymer (Rovace SF 091) | 50 |
| Carboxylated styrene acrylic polymer (Synthemul 40422) | 50 |
| N,N-Dimethyl-1-octadecamine (Armeen DM18D) | 1.2 |
| Polyoxyethylene (23) lauryl ether (BRIJ 35 Liquid/Gel) | 2.0 |
| Myristyl alcohol | 0.3 |
| Cetyltrimethylammonium chloride | 1.4 |
| Sodium lauryl sulfate (Calfoam SLS 30) | 1.2 |
| Dipropylene glycol monomethyl ether (Dowanol DPM) | 1.1 |
| Ethylene glycol (Ethylene glycol) | 1.1 |
| Polyoxyethyleneoxide (Polyox WSR,N-3000) | 0.2 |
| Corn or potato unmodified starch (Starch) | 35 |
| Propane/isobutane/dimethyl ether (11.2/68.3/20 Wt. %) (A-45/DME Propellant) | 5.0% of the total Wt. |

EXAMPLE 20

| Ingredient | Grams |
| --- | --- |
| Vinyl acetate/acrylic copolymer (Wallpol 40143) | 60 |
| Carboxylated styrene acrylic polymer (Synthemul 40422) | 40 |
| N,N-Dimethyl-1-octadecamine (Armeen DM18D) | 1.1 |
| Polyoxyethylene (23) lauryl ether (BRIJ 35 Liquid/Gel) | 2.0 |
| Myristyl alcohol | 0.2 |
| Sodium lauryl sulfate (Calfoam SLS 30) | 2.0 |
| Dipropylene glycol monomethyl ether (Dowanol DPM) | 1.0 |
| Ethylene glycol (Ethylene glycol) | 1.0 |
| Polyoxyethyleneoxide (Polyox WSR,N-3000) | 0.2 |
| Corn or potato unmodified starch (Starch) | 15 |
| Propane/isobutane/dimethyl ether (11.2/68.3/20 Wt. %) (A-45/DME Propellant) | 4.8% of the total Wt. |

In appropriate places, the surfactants could be substituted for by using polyoxyethylene (20) sorbitan monopalmitate (Tween 40), polyoxyethylene (20) sorbitan monolaurate, alkyl phenol ethoxylate (Surfonic N-95).

All of these foams were more or less satisfactory, thus showing that different latices could be used in keeping with the invention. Different surfactants, co-surfactants and the like could be used, as well as variable quantities of propellant, including propellants with and without ether.

EXAMPLE 21

A commercial sample of a latex foam was purchased. This foam was in an aerosol can and was adapted for a use similar to the foam of the present invention. Analysis of the foam indicated the following approximate composition.

| Function | Probable Component | Approx Wt. % |
| --- | --- | --- |
| Base Polymer | Blend of Polystyrene and Poly(vinylacetate:ethylene) (approximately 31% ethylene units) | 51 47 |
| Surfactant | 2-(2-Hexadecyloxy) ethyloxy) ethanol or 2-(Hexadecyloxy) ethanol | 1.5 |
| Amine | N-N Dimethyl-1-Octadecanamine (or its ammonium chloride salt) | 1 |
| Solvent | Dipropylene glycol methyl ether (DPGME) | Trace |
| Propellant | Propane (60%) Dimethyl ether (10%) Butane (30%) | Unk. |

This foam composition, which represented at least one prior art product, would function as a latex patching compound/crack filler, but it was capable of noticeable improvement. If dispensed outside of a 45–80° temperature envelope, it would sag and run considerably. The foam was very reluctant to cure beneath the surface, particularly in areas of significant cross-section. Cell size was inconsistent. It was not water resistant, regardless of the time of dispensing. This foam was used as a benchmark in comparing Examples 1–15, above.

Referring now to the invention, it was found that starch, especially in conjunction with the proper amount and type of surfactant, and in some cases with additional ingredients, provided greatly improved foam stability. Improved workability, uniformity of foam cell size, lack of sag, and curing throughout a mass, even one having a low surface-to-volume area, was demonstrated.

The finished product displayed improved mechanical properties, including resilience, compression resistance and flexibility. It was water resistant and could be dispensed and cured throughout a much greater temperature range.

While the Applicant does not wish to be bound by any particular theories or principles of operation, and while the invention does not depend for its effectiveness on any particular theory or principle of operation, it may be that the addition of corn or potato starch to the latex, in combination with specific surfactant, amine, coalescing agent, blowing agent, and other foam additives creates a novel effect. Gelation of starch can occur, parallel with coalescing of the polymer in the latex during curing of the foam, and thus improve the foam properties.

It is thought possible that intermolecular interactions (hydrogen bonding and electrostatic interactions) between hydroxyl-containing starch and functionalized emulsion polymers can also contribute to the improvement of physico-mechanical properties of the resulting foams. Foam properties, such as stiffness, resilience, skin consistency, dimensional stability, water sensitivity, and sag under different temperature/humidity curing conditions, as well as the rate of curing, can be controlled by varying the level of starch. The ratio between "flexible" and "rigid" latices used in the foam preparation, as well as the surfactant and tertiary amine levels are thought possibly to be responsible for the final product.

Other foam ingredients such as the coalescing agent (Dowanol DPM), the anti-freeze (ethylene glycol), and the polyoxyethylene water-soluble solid contribute to improvement of foam properties. Foam cell structure has a great effect on the mechanical properties of the foam. These can be controlled, more of less, by the type and level of surfactant and amine present in the mix.

Particularly good results were obtained by using highly ethoxylated fatty alcohols, having an HLB of greater than 15 or 16 as a surfactant, particularly the BRIJ 35 Liquid/Gel. Tertiary amines, especially an amine containing a long hydrophobic chain, such as Armeen DM18D, can react with carboxyl groups in the carboxylated latex polymer (Synthemul 40422), and act as an internal emulsifier. This is thought to stabilize the foam mixture and have a positive effect on foam cell structure.

It will thus be seen the present invention provides a water dilutable latex foam composition having a number of advantages and characteristics including those pointed out herein and others which are inherent in the invention. Several preferred embodiments having been described by way of illustration, it is anticipated that modifications to the described forms of product will occur to those skilled in the art and that such modification and changes may be made without departing from the spirit of the invention or the scope of the appended claims.

I claim:

1. A method of modifying a latex emulsion foam to impart greater foam stability and more favorable interior curing properties to a mass thereof, said method comprising, adding from about 20 parts to about 100 parts starch to about 100 parts of a latex emulsion from the group consisting of a vinyl acetate/acrylic copolymer and a carboxylated styrene-acrylic polymer having from about 30% to about 70% solids content, together with from about 1 to about 6 parts of a surfactant having an HLB of 15 or larger, about 0.5 to about 4 parts of a coalescing agent, and from about 0.1 to about 0.5 parts of a polyoxyethylene oxide co-surfactant having a molecular weight of from about 80,000 to about 8,000,000, and placing the modified latex composition in an aerosol container with from about 3% to about 8% of an aerosol propellant, based on the weight of the total composition.

2. A method as defined in claim 1, wherein said starch is added in an amount of from about 25 to about 50 parts.

3. A method as defined in claim 1, which further includes from about 30 to about 70 parts of a carboxylated styrene-acrylic polymer.

4. A method as defined in claim 1, which further includes adding a tertiary amine having two lower alkyl groups and one $C_{14}$–$C_{24}$ group forming a part thereof.

5. A method as defined in claim 1, wherein said co-surfactant is present in an amount of from about 0.5 parts to about 2.5 parts.

* * * * *